United States Patent [19]

Fukushige

[11] Patent Number: 5,234,518
[45] Date of Patent: Aug. 10, 1993

[54] FELTING COILED SLEEVE AND METHOD FOR PREPARING THE SAME

[75] Inventor: Yoshimi Fukushige, Hyogo, Japan
[73] Assignee: Fuji Corporation, Japan
[21] Appl. No.: 771,757
[22] Filed: Oct. 4, 1991
[51] Int. Cl.⁵ .................... B65H 81/00; B31C 13/00
[52] U.S. Cl. .................... 156/195; 156/189; 156/193
[58] Field of Search .................... 156/195, 189, 193; 29/127, 121.4

[56] References Cited

U.S. PATENT DOCUMENTS

| | | | |
|---|---|---|---|
| 2,913,011 | 11/1959 | Noyes | 156/144 X |
| 3,069,304 | 12/1962 | Faurbach | 29/127 |
| 3,280,516 | 10/1966 | Kimmerle | 29/127 X |
| 3,402,085 | 9/1968 | Trimble | 156/189 |
| 3,616,123 | 10/1971 | Reynolds | 156/191 X |
| 3,974,010 | 8/1976 | Cox | 156/93 |
| 4,192,050 | 3/1980 | Appenzeller | 29/121.4 X |
| 4,211,595 | 7/1980 | Samour | 156/190 X |
| 4,273,601 | 6/1981 | Weingart | 156/190 X |
| 4,308,082 | 12/1981 | Menzel | 156/195 X |
| 4,708,756 | 11/1987 | Büsen | 156/195 X |
| 4,824,502 | 4/1989 | Nagayoshi | 156/190 X |
| 5,009,943 | 4/1991 | Stahl | 156/263 X |
| 5,055,242 | 10/1991 | Vane | 156/187 X |
| 5,071,687 | 12/1991 | Shigetoh | 156/191 X |

FOREIGN PATENT DOCUMENTS

| | | |
|---|---|---|
| 5695581 | 3/1981 | Japan . |
| 56-114670 | 12/1981 | Japan . |
| 1-115576 | 4/1989 | Japan . |
| 3-13458 | 1/1991 | Japan . |

Primary Examiner—David A. Simmons
Assistant Examiner—Charles Rainwater

[57] ABSTRACT

A felting coiled sleeve has closely fibrous structure and a substantially cylindric shape. The sleeve is put on a body of roller suitable for carrying an aluminum extruded shape or a surface treating steel sheet. The sleeve is prepared by attaching reinforcing thread with straight stitches along one longitudinal side of a felting strip by sewing and curving moderately the strip in a horizontal plane simultaneously. Then the curved strip is bent into a helical shape through a pair of conical rollers, winding the strip tightly round a shaft of a device for obtaining sleeve, applying pressure on one side face of the wound strip, fixing the compressed strip in the cylindric shape, and smoothing the outer surface of the coil.

5 Claims, 6 Drawing Sheets

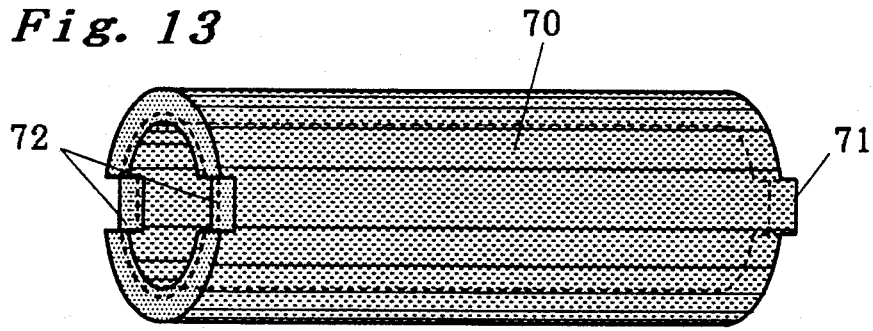
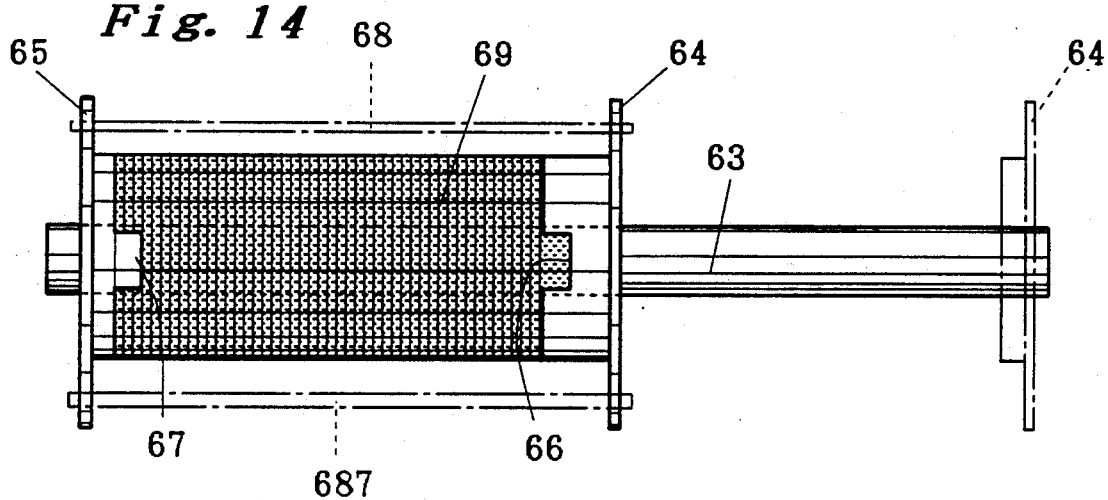
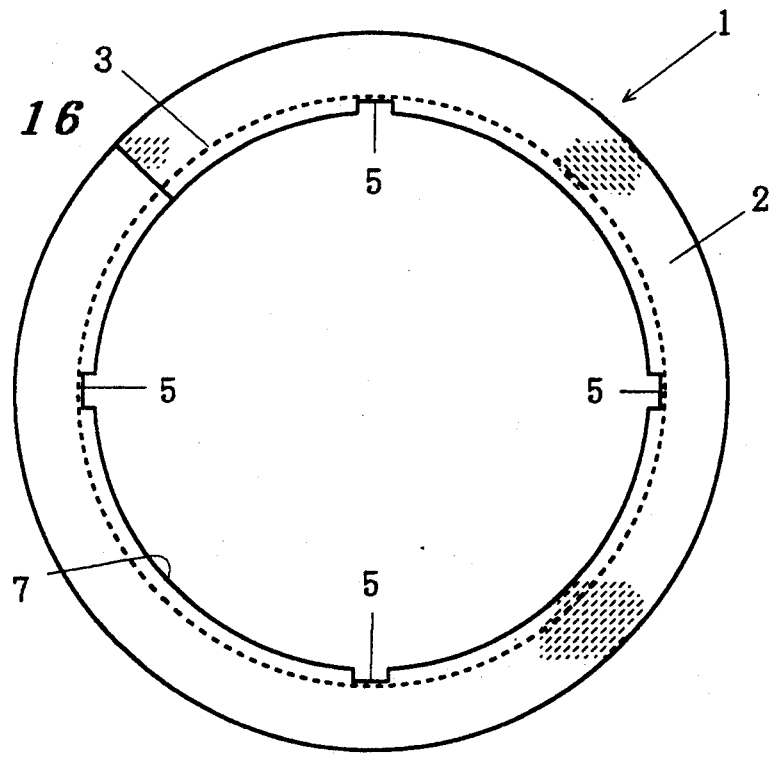

FELTING COILED SLEEVE AND METHOD FOR PREPARING THE SAME

FIELD OF THE INVENTION

This invention relates to a felting coiled sleeve and a method for preparing the sleeve with various dimensions from small to large diameter, and more particularly, relates to a felting coiled sleeve put on a body of a carrying roller, especially a driving roller out of such rollers, or a polishing roll.

BACKGROUND OF THE INVENTION

In an aluminum extruding and manufacturing plant, an aluminum extruded shape forced through a die is transported to a second apparatus in a high temperature state to get predetermined and manufactured goods. Since the extruded shape has a temperature nearly about melting point (660° C.) of aluminum direct after forcing through the die, damage happens on the surface of the extruded shape by contacting with the peripheral surface of steel rollers direct. Accordingly, it is ordinary to put a felting tube made from heat-resistant fibers on the roller in order to buffer the extruded shape. Since a known felting tube is shaped direct into a tubular form by needle-punching fiber web using the exclusive machine, it is probable to prepare merely the tube with the dimension proper to the machine, and variation of the goods is low and the production cost of the tube is terribly expensive.

While, in a steel manufacturing plant, after pickling and annealing, a rolled band steel is continuously plated with tin through electrolytic bath and burnished to develop its alloy phase by heating the surface of the steel. Preferably, the steel direct after plating is gradually cooled for developing the alloy phase sufficiently. From this standpoint, it has been investigated to use a felt-covered roller as an equipment for carrying the steel.

In order to prepare the felt-covered roller, it is ordinary to cut a large felting sheet into many disks with a doughnut form and then fit the disks on the roller body to overlap them around the roller shaft cylindrically, as disclosed in Japanese Patent Open Publications No. 11670/81 and No. 95581/81. This preparation is uneconomical because great quantities of felting scraps occur when cutting the sheet into disks. Furthermore, it is very difficult to discard these felting scraps in order to prevent an environmental pollution and thus the discard cost of these felting scraps is very expensive.

Also, Japanese Patent Open Publications No. 115576/89 describes that a felting strip is curved by pressing through some pairs of conical rollers and then wound around a shaft curve with four longitudinal key projections. In this method, it is necessary to fit the key grooves of the strip on each of the key projections of the shaft at the time when winding the strip. This fitting work is so troublesome that it is almost impossible to increase operation efficiency. Furthermore, when strong pressure is applied on one side face of the wound strip, the center of the wound strip enlarges outwardly and thus the compressed strip is deformed into a barrel shape. It is not preferable to use such a deformed sleeve for a carrying roller because the sleeve cannot support the transported object uniformly and gets out of the shape easily. On the contrary, when the applied pressure is weakened in order to prevent such deformity, the sleeve is inferior in wear-resistance because hardness of the sleeve is not sufficient.

Correspondingly, I have already proposed a new method in order to improve the problem mentioned above. According to my method as described in Japanese Patent Publication No. 13458/91, about a thin shaft one felting strip is closely wound clockwise and secondly other strip is wound anticlockwise in order to get two layers of felting tube. This tube is finally removed from the shaft and then carried to an aluminum manufacturing plant or the like. As the tube is put on a body of a carrying roller in the plant, it has profits that only the tube can be efficiently prepared in felt manufacturing works. However, the tube has not sufficient buffering or cushion effect because the majority of felting fibers is nearly parallel to the surface of the tube.

SUMMARY OF THE INVENTION

A felting coiled sleeve according this invention has closely fibrous structure and a substantially cylindric shape. The coiled sleeve includes helical strip of felting, reinforcing thread attached along an inner side of the strip by sewing, and finishing resin applied to the inner and/or outer surfaces of the sleeve. In this specification, the term "felting" means conventional felts and felt-shape nonwoven fabrics. In order to prepare the coiled sleeve, the felting strip employed is obtained from a sheet cut tape-like. Along one longitudinal side of the strip, reinforcing thread is attached with straight stitches by sewing using a known machine and the strip is curved moderately in a horizontal plane by tension of the thread simultaneously. The curved strip is bent into a helical shape through a pair of conical rollers. The strip is wound tightly round a shaft of a suitable former. When a known press machine applys pressure on one side face of the wound strip to press down the wound strip, the strip has closely fibrous structure and a substantially cylindric shape and is fastened in this compressed state. Finishing resin is applied to the inner and/or outer surfaces of the coil and then dried in order to keep it cylindric. Finally the outer peripheral surface of the coil is smoothed.

It is practicable to form a convex on one side face and a concave on the other side face of the coil respectively, the convex is corresponding to the concave in configuration. There is now applied a pair of disks having a concave or convex on the opposite face. First, it is necessary to coat the opposite face of the disks with parting agents and impregnate the both sides of the wound strip with liquid resin. When pressed down between the disks, the convex or concave may be formed on the both side faces of the coil.

Instead of the convex and concave mentioned above, two or more longitudinal grooves may be sunk in the inner peripheral surface of the sleeve at equal circumferential distance. It is necessary to locate the attached position of the reinforcing thread so that it is not cut when the grooves is sunk with a known milling machine.

It is therefore an object of the invention to provide a novel felting coiled sleeve, which has closely fibrous structure and thus is excellent in wear-resistance when used as a roller cover.

It is another object of the invention to provide a novel felting coiled sleeve with excellent buffering effect as it is put on a body of a carrying or polishing roller.

It is still another object of the invention to provide a novel felting coiled sleeve put on a roller body with relatively small diameter, which is suitable for carrying an aluminum extruded shape or the like.

It is yet another object of the invention to provide a novel felting coiled sleeve put on a roller body with relatively large diameter, which is suitable for carrying a surface treating steel sheet or the like.

It is yet another object of the invention to provide a novel roller used as a driving roller only at the place that a small driving force is applied, in which the roller body is united with a felting coiled sleeve.

It is yet another object of the invention to provide a novel method for preparing a coiled sleeve, in which the wound strip maintains an accurately cylindric shape in the whole process of pressing and finishing.

It is yet another object of the invention to provide a novel method for preparing a coiled sleeve, resulting in a remarkably easy and prompt improvement in work.

These and other objects, features and advantages of the invention will become more apparent to those skilled in the art from the following description.

BRIEF DESCRIPTION OF THE DRAWINGS

FIG. 4 is a longitudinal view showing a pressing process of a method according to this invention;

FIG. 5 is an elevational view showing another pressing process of the method;

FIG. 6 is a sectional and enlarged view of a modification of the felting strip;

FIG. 13 is a perspective view of other coiled sleeve of this invention;

FIG. 14 is similar to FIG. 5, showing further pressing process for preparing the coiled sleeve of FIG. 13;

FIG. 16 is an end view of the coiled sleeve of FIG. 15;

DESCRIPTION OF THE INVENTION

Figure 1:
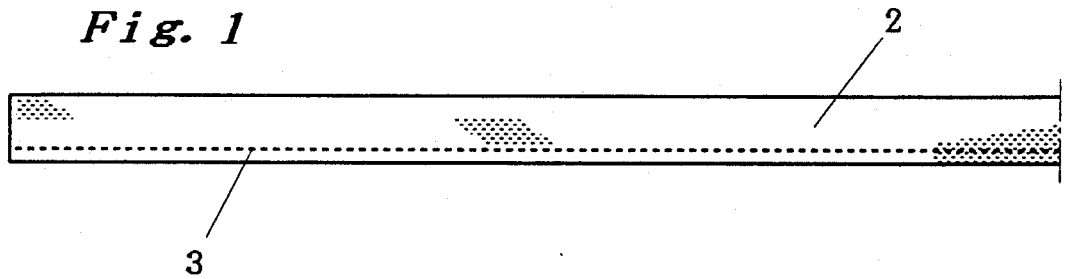
FIG. 1 is a partial plan view of a felting strip employed in this invention.

In preparation of coiled sleeve 1 (FIG. 4) according to the invention, as shown in FIG. 1, a strip 2 employed may be usually obtained by cutting a wide felting sheet (not shown) tape-like. Relating to the strip 2, it is possible to sew two or more pieces together and/or connect to each other up to a predetermined longitudinal size by sewing. This sheet with about 0.5 to 4 mm. thick may be produced from various sorts of fiber web by punching with needles. Since fibers constructing the strip 2 are appropriately selected according to usage of the sleeve 1, not only natural or synthetic fibers but also a blend of such fibers may be employed as the raw material of the felting sheet. For example, on a roller 4 (FIG. 9) for carrying an aluminum extruded shape 5 (FIG. 9), it is preferable that the sleeve 2 is made from Aramid fibers with excellent heat-resistance or a blend of Aramid and carbon fibers. As Aramid fibers, poly para-phenylene terephthalic amide and metaphenylene isophthalic amide fibers may be exemplified, the former is preferable for heat-resistance of high temperature and the latter can be used in the place of relatively low temperature. In carbon fibers used jointly with Aramid fibers, flame-resistant fibers with relatively low heat-resistance may be also included. A percentage and sort of such carbon fibers are appropriately selected corresponding to the place applied. In the case of carrying an aluminum extruded shape 5 (FIG. 9) in relatively low temperature state, the strip 2 may be made from polyester fibers, and also for a polishing roll, the strip made from wool fibers may be used.

Figure 2:
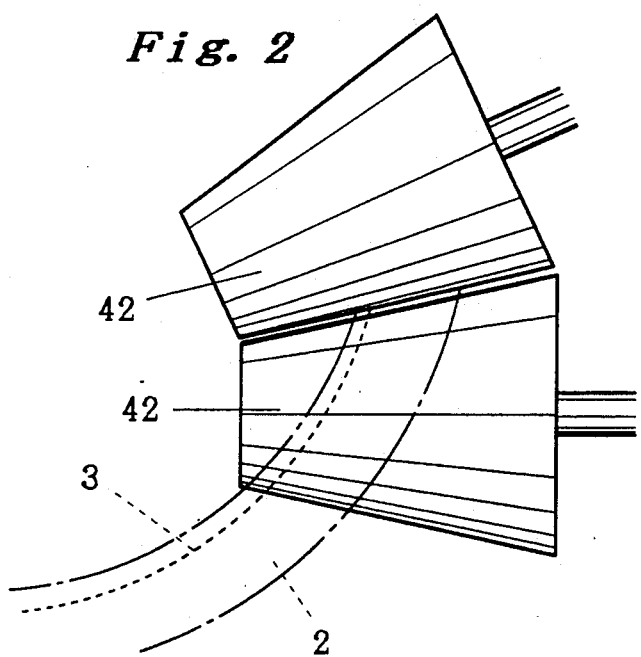
FIG. 2 is an elevational view of a pair of conical rollers for bending the strip into a helical shape.
Figure 17:
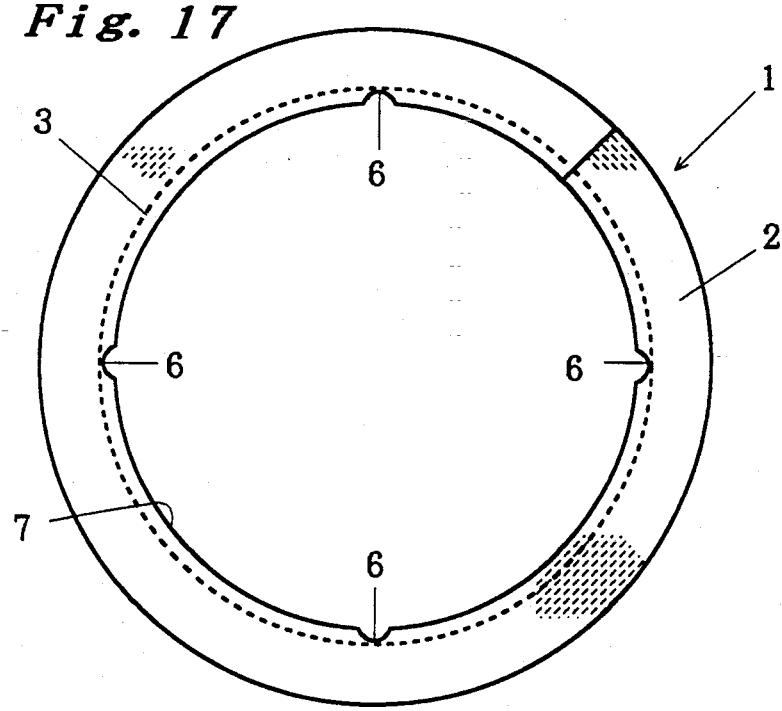
FIG. 17 is similar to FIG. 16, showing further coiled sleeve.

Reinforcing thread 3 is attached along one longitudinal side of the strip 2 by sewing with a known machine. As the thread 3 is a high-tension thread which is not cut during the pressing work, it is preferable to make the thread 3 from filaments of Aramid fibers, e.g., "KEVLAR" manufactured by E. I. DU PONT DE NEMOURS & CO. Though the thread 3 is usually attached closely one longitudinal side of the strip 2, it is necessary to locate the attached position of the thread 3 at a distance from the longitudinal side of the strip 2 because the thread 3 is not cut when the grooves 5 or 6 are sunk in the inner peripheral surface 7 of the sleeve 1, as indicated in FIG. 16 or 17. By a tension of the thread 3 during sewing, the sewed side of the strip 2 shrinks wave-like and thus the strip 2 is curved moderately in a horizontal plane, as shown in dot-dash lines in FIG. 2. As the horizontal curve of the strip 2 increases when stitches or tension of the thread 3 make large or strong, it is preferable to adjust the stitches and tension according to the prearranged diameter of the sleeve 1.

Figures 4, 5, 6:
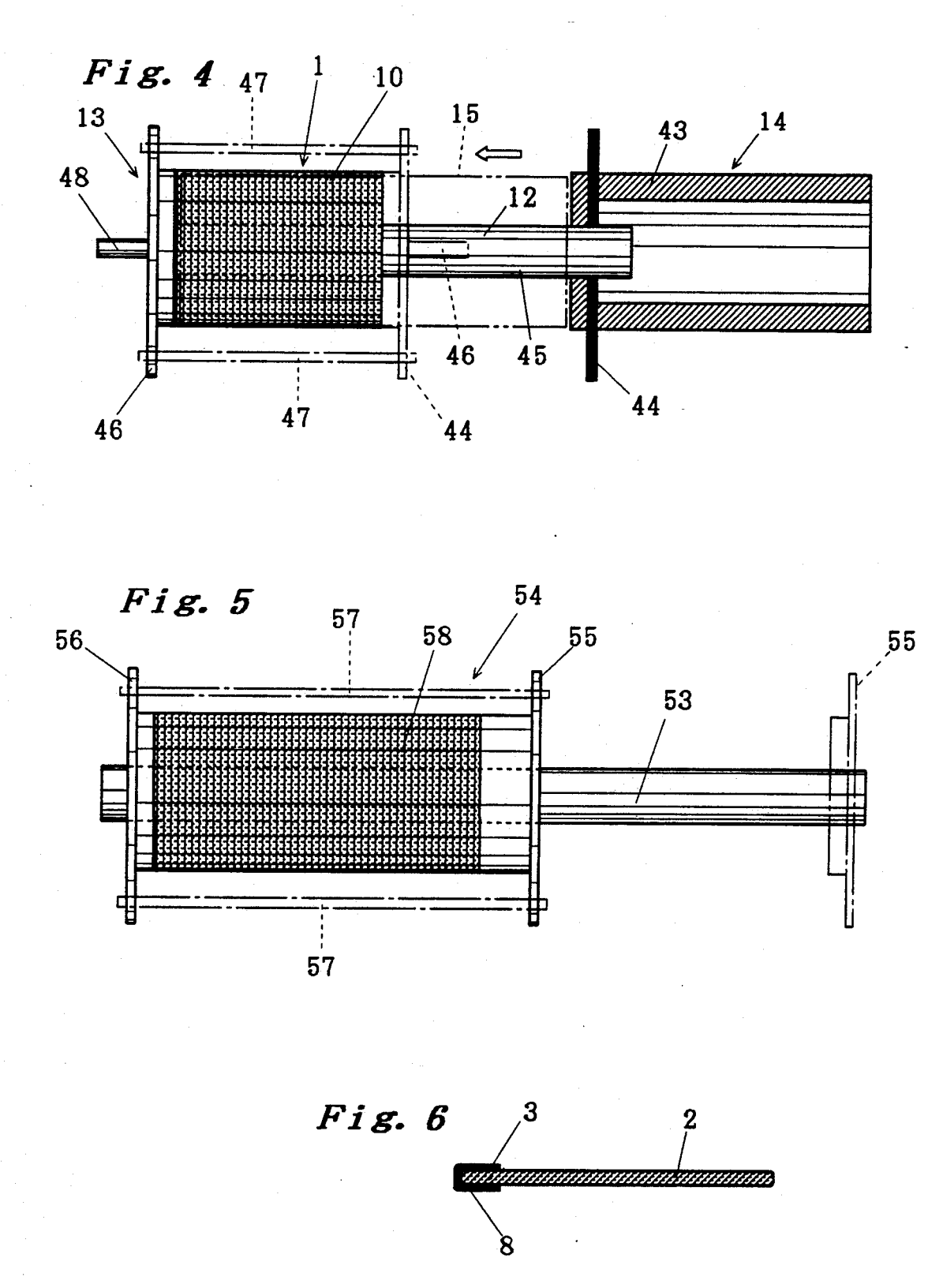

If desired, a heat-sensitive plastic film 8 with a low melting point may be sewed to the strip 2 at the same time when the thread 3 is attached to the strip 2, as shown in FIG. 6. It is also practicable to use a nonwoven fabric with the same property in stead of the film 8. A melting point of the film 8 must be lower than that of the felt fibers of the strip 2 and the film 8 must have the adhesive property with heating and pressing. Accordingly, The film 8 may be made from plastics with a low melting point, such as polyethylene, polypropylene, EVA. If the strip 2 is constructed from fibers with excellent heat-resistance, it is also possible to use polyester film. The film 8 is not only sewed with U-shaped cover stitches on one longitudinal side of the strip 2, as shown in FIG. 6, but also it is possible to close up the film 8 and the strip 2 by sewing. After winding and compressing of the helical strip 9 (FIG. 3), the compressed strip 10 (FIG. 4) is heated at the temperature above a melting point of the film 8 to fasten the overlapped portions of the strip 10 to each other so as to keep it cylindric.

Figure 3:
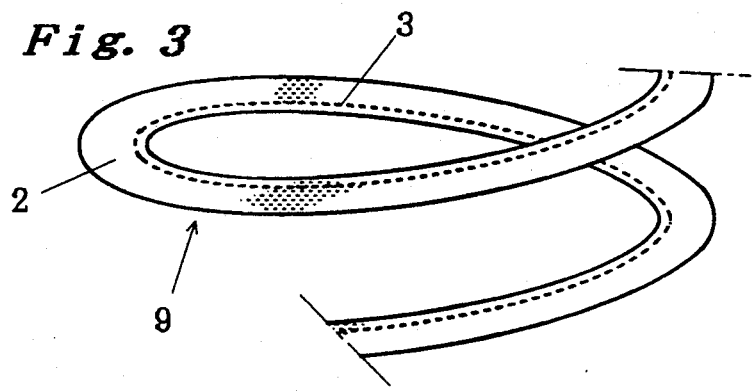
FIG. 3 is a partial perspective view of the strip bent through the conical rollers of FIG. 2.

The strip 2 curved moderately by tension of the thread 3 is passed through a pair of conical rollers 11, 11 (FIG. 2) so as to be bent into a helical shape, as shown in FIG. 3. The helical strip 9 is wound round a shaft 12 of a suitable former 13 to form into a cylindric shape, as exemplified in FIG. 4. In the winding of the helical strip 9, it is necessary to wind the strip 9 as tightly round the shaft 12 as possible. Then a known press machine 14 applys pressure strongly on one side face of the wound strip 15. In this pressing process, the wound strip 15 decreases markedly in length and contracts slightly inward to tighten the shaft 12 or a pipe 16 (FIG. 7) strongly. In a roller 17, the pipe 16 has longitudinal stoppers 19 on the outer peripheral surface 20. It is therefore certain to fit the sleeve 18 on the pipe 16. When the sleeve in the compressed state is held between two fixing disks 21, 21 (FIG. 8) and the disks are weld or pinned on the both sides of a roller body, e.g., pipe 16 respectively, it is unnecessary to get the resin treatment mentioned below.

The strip 10 is maintained in the compressed state by a suitable fastener such as stay bolts (FIG. 4) and then finishing resin (not shown) is applied to the inner and/or outer surfaces of the compressed strip 10 and dried. The resin employing in this treatment is appropriately selected according to usage of the sleeve 1. The resin is, for example, epoxy, acrylic or inorganic type adhesives with heat-resistance. As a finishing treatment, it is preferable to smooth the outer peripheral surface of the coil 10 to obtain the sleeve 1. The diameter of the sleeve 1 of this invention is determined corresponding to the outer diameter of the shaft 12. It is practicable to prepare the sleeve 1 of the diameter of about 35 to 3000 mm., and the density of 0.3 to 0.8 g/cm$^3$ from the felting sheet of the density of about 0.05 g/cm$^3$ by the method of this invention.

The sleeve 1 of this invention is maintained in an accurately cylindric shape in presence of the reinforcing thread 3 by the resin treatment after the pressure forming. When the sleeve 1 is put on the body of a carrying roller 4, it is excellent in durability and prevents damage of the surface of an aluminum extruded shape in high temperature state because of closely fibrous structure and good uniformity on surface. The sleeve 1 is also suitable for a polishing roll because the majority of felting fibers turns to nearly radiant direction. According to the method of this invention, it is certain to prepare the sleeve 1 having a desired diameter more promptly and easily, as compared with the known method for preparing a tubular using an exclusive machine.

Figure 10:
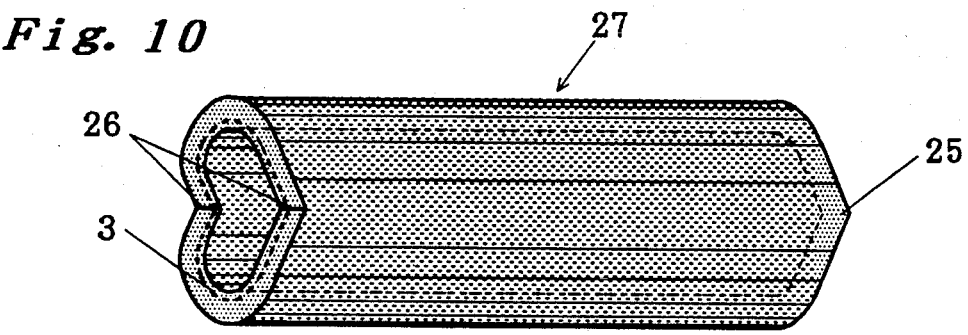
FIG. 10 is a perspective view of another coiled sleeve of this invention.

As shown in FIG. 10, It is practicable to form the convex 25 on one side face and the concave 26 on the other side face of the sleeve 27 for covering a body 28 (FIG. 11) of a carrying roller, respectively. The formed convex and concave have not only V shaped plane symmetrically with respect to the axial line in FIG. 10, but also rectangular or half-circular shaped plane at equal circumferential distance in FIG. 13. In the case of preparing the sleeve 27, there is applied a pair of the disks 29, 29 (FIG. 12) having the concave 30 or convex 31 on the opposite face. First, it is necessary to coat the opposite faces of the disks 29, 29 and the peripheral surface of the shaft 32 (FIG. 12) with parting agents and then impregnate the both sides of the wound strip 33 with liquid resin. Between the disks 29, 29, the wound strip 33 is pressed down strongly with a press machine 34 to compress the strip 33 and thus obtained coil 35 has the convex 25 or concave 26 formed on the both side faces. In this compressed state, finishing resin is applied to the inner and/or outer surfaces of the coil 35 and then dried. Finally the outer peripheral surface of the coil 35 is smoothed to obtain the sleeve 27.

Figure 11:
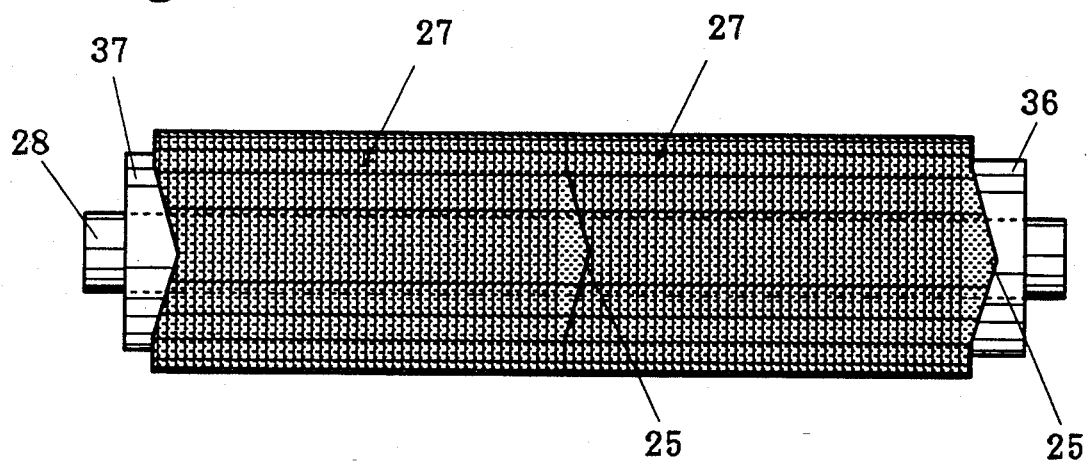
FIG. 11 is a side view of other driving roller with the coiled sleeves of FIG. 10.
Figure 12:
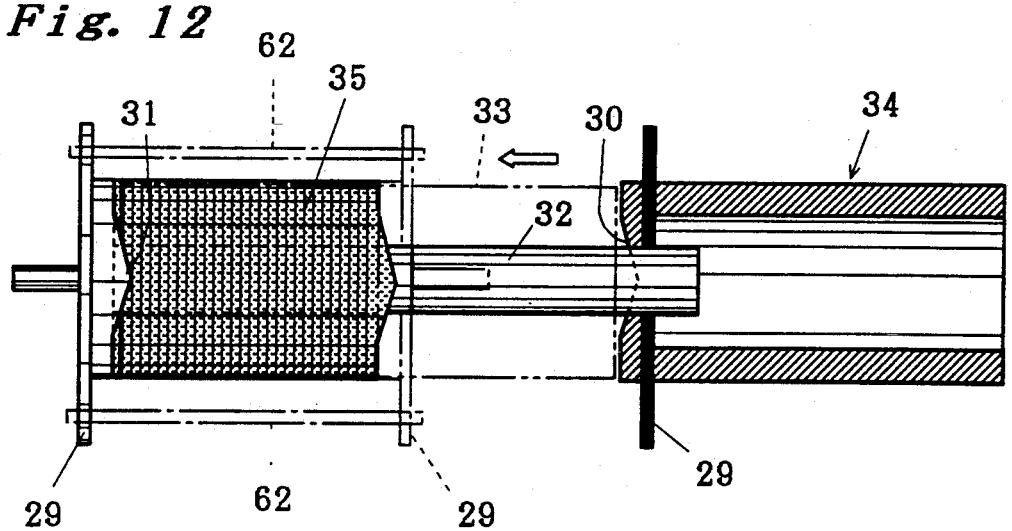
FIG. 12 is similar to FIG. 4, showing other pressing process for preparing the coiled sleeve of FIG. 10.

If the corresponding convex 25 or concave 26 is formed on the both side faces of the sleeve 27, it is certain to cover the roller body 28 with one or more sleeves 27 and hold the sleeves 27 between the fixing disks 36, 37 (FIG. 11). As this result, the sleeves 27 can always rotate together with the body 28, i.e., the roller does not run idle even if large torque is placed on the body 28. By applying and drying the liquid resin, the convex and concave 25, 26 on the both side faces of the sleeve 27 do not deform even if the body 28 of the driving roller lasts under usage. Thus, it is certain to prevent the driving roller from running idle over a long time. Usually, the sleeve 27 with relatively small diameter is suitable for a driving roller of rollers for carrying an aluminum extruded shape. It is also probable to apply the sleeve to a driving roller of rollers for carrying a surface treating steel sheet if the sleeve has relatively large diameter.

As shown in FIG. 16, instead of the convex 25 and concave 26 mentioned above, two or more longitudinal grooves 5 may be sunk in the inner peripheral surface of the coil 10 (FIG. 4) after resin treatment with a cutting machine (not shown) or press-deforming shaft 38 (FIG. 17). The groove has not only rectangular shaped section in FIG. 16, but also half-circular or triangular shaped section or the like, as in FIG. 17. A number of the grooves 5 is usually four at equal circumferential distance, but it is possible to sink one to three or five and more grooves.

Figure 15:
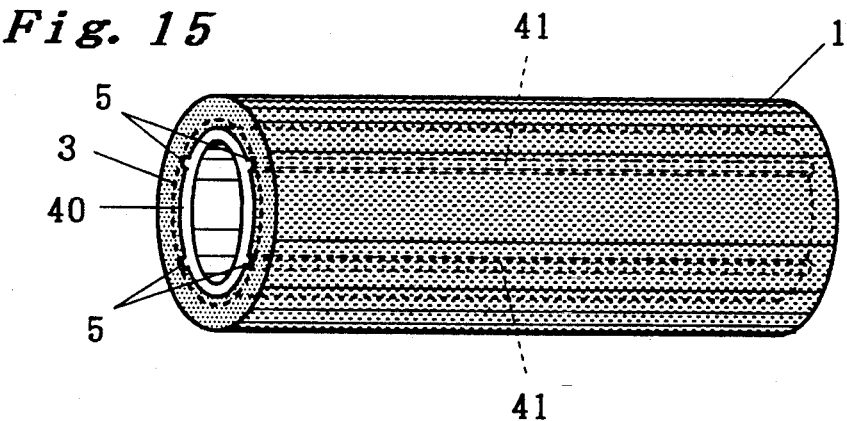
FIG. 15 is a perspective view of a driving roller with further coiled sleeve.

When the sleeve 1 (FIG. 15) is put on the roller body 40, the longitudinal grooves 5 (FIG. 16)sunk in the sleeve 1 are fitted on the longitudinal stoppers 41 mounted on the outer peripheral surface of roller body 40. As this result, the sleeve 1 can always rotate together with the body 40, i.e., the body 40 does not run idle even if large torque is placed on the body 40. Since at least the inner peripheral surface of the sleeve 1 is treated with resin, the grooves 5 of the sleeve 1 do not deform even if the body 40 of a driving roller lasts under usage. Thus, it is certain to prevent the driving roller from running idle over a long time. Usually, the sleeve 1 with relatively large diameter is suitable for a cover of a driving roller of the rollers for carrying a surface treating steel sheet.

This invention will be understood more readily with reference to the following examples, and variations may be made by one skilled in the art without departing from the spirit and scope of this invention.

EXAMPLE 1

In order to prepare the sleeve 1, there was employed a felting sheet with the density of 0.05 g/cm$^3$ and the thickness of 1.5 mm. produced from web of Aramid fibers ("CORNEX" manufactured by TEIJIN CO.) by needle-punching. The sheet was cut in 15 mm. wide to obtain a strip 2. Along one longitudinal side of the strip 2, reinforcing thread 3 made from filaments of Aramid fibers ("KEVLAR") was attached with straight stitches by sewing using a machine. By the attachment of the thread 3 with sewing, the strip 2 was curved moderately in a horizontal plane, as indicated in dot-dash lines in FIG. 2. Then the curved strip was bent uniformly through a pair of conical rollers 42, 42 to obtain the helical strip 9, as shown in FIG. 3.

The helical strip 9 was wound round the shaft 12 (FIG. 4) with 35 mm. diameter of a former 13. At this time, it is necessary to contact the inner longitudinal side of the helical strip 9 with the peripheral surface of the shaft 12 as tightly as possible. A press machine 14 applied pressure strongly on one side face of the wound strip 15. The machine 14 has a cylindric pusher 43 and a disk 44 slided on the shaft 12, of which a forward portion 45 is removable.

The disk 44 contacted with the side face of the strip 15 was fixed with screws or a pin (not shown) in the pressing position, as indicated in solid lines in FIG. 4. When it was impossible to use the screws or pin, the disk 44 may be connected to a disk 46 with stay bolts 47. As the wound strip 15 decreased markedly in length in this pressing process, the compressed strip 10 had the length of about 500 mm. The outer surface of the coil 10 was coated or impregnated with acrylic resin and then dried. Subsequently, the forward portion 45 was removed from the former 13 and an axle 46 was screwed on the center of the disk 44. By rotating the coil 10 about the axles 46 and 48, the outer surface of the coil 10 was smoothed. After removing the shaft 12 and the disks 44 and 46, it is certain to obtain the sleeve 1 with the density of 0.5 g/cm$^3$ and the diameter of 600 mm.

Figure 9:
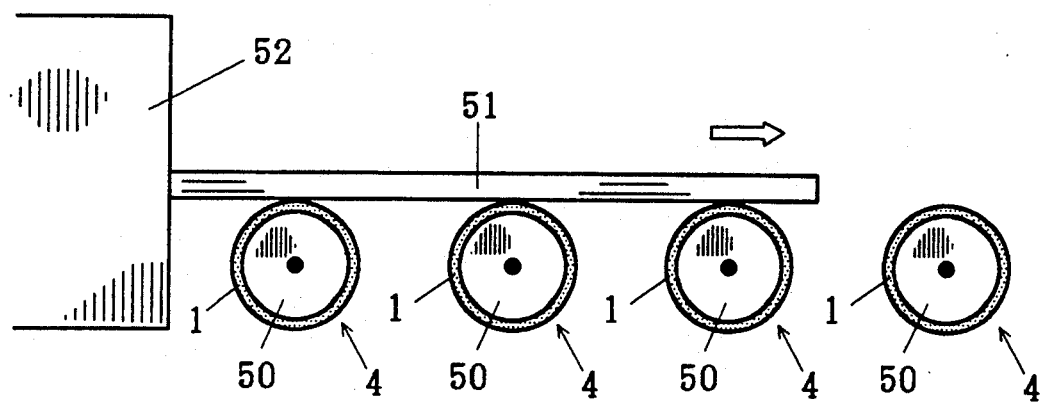
FIG. 9 shows a very small portion of a transfer apparatus for an aluminum extruded shape, including the rollers covered with the coiled sleeve of this invention respectively.

In order to put the sleeve 1 on the body 50 of a carrying roller 4, as shown in FIG. 9, it is so determined that the inner diameter of the sleeve 1 is almost the same as or slightly larger than the diameter of the roller body 50, and it is only necessary to force the sleeve 1 on the roller body 50. An aluminum extruded shape 51 in high temperature state can be continuously placed on each of the rollers 4 after forced through a die 52. A wearing amount of the sleeve 1 was lack of uniformity axially and generally the center part wore out more than the left or right part of the sleeve 1. Therefore, in the case that the sleeve 1 parted in three is put on the roller body, it is economical to exchange only the worn-out center part of the sleeve 1 upon occasion by pulling out the left or right part from the body 50.

EXAMPLE 2

There was employed the same strip 2 as in EXAMPLE 1. When the same reinforcing thread as in EXAMPLE 1 was attached with straight stitches, the polypropylene film 8 was sewed with U-shaped cover stitches on one longitudinal side of the strip 2, as shown in FIG. 6. The helical strip 9 was obtained in the similar manner as in EXAMPLE 1.

Subsequently, the peripheral surface of the shaft 12 (FIG. 4) with 35 mm. diameter was coated with parting agents. The helical strip 9 thus obtained was wound the shaft 12 and then the press machine 14 applied pressure strongly on one side face of the wound strip 15. The disk 44 contacted with the side face of the strip 15 was fixed with screws or a pin (not shown). In this pressing position, the coil 10 was heated at the temperature of 170° C. to fasten the overlapped portions of the strip 10 to each other by the molten film so as to keep the coil 10 cylindric. By rotating the coil 10 about the axles 46 and 48, the outer surface of the coil 10 was smoothed. After removing the shaft 12 and the disks 44 and 46, it is certain to obtain the sleeve 1 with the density of 0.5 g/cm$^3$ and the diameter of 60 mm. The sleeve can serve for the similar usage as in EXAMPLE 1.

EXAMPLE 3

There was employed a felting sheet with the density of 0.2 g/cm$^3$ and the thickness of 1 mm. produced from web of 70 weight % of Aramid fibers ("KEVLAR 29" manufactured by E. I. DU PONT DE NEMOURS & CO.) and 30 weight % of carbon fibers ("PYROMEX" manufactured by TOHO RAYON CO.) by needle-punching. The same reinforcing thread as in EXAMPLE 1 was attached with straight stitches on one longitudinal side of the strip 2 and then the helical strip 9 was obtained in the similar manner as in EXAMPLE 1.

The helical strip 9 thus obtained was wound round a long shaft 53 (FIG. 5) with 35 mm. diameter of a former 54. At this time, it is necessary to contact the inner longitudinal side of the helical strip 9 with the surface of the shaft 53 as tightly as possible. A press machine applied pressure strongly on one side face of the wound strip to transfer a disk 55 in dot-dash lines to the position in solid lines in FIG. 5. When the disk 55 was fixed by connecting it to the disk 56 with stay bolts 57, the wound strip decreased markedly in length. The coil 58 has the length of about 500 mm. The shaft 53 was removed from the coil 58 and then the inner surface of the coil was coated or impregnated with acrylic resin. Subsequently, the outer surface of another pipe (not shown) having the same diameter as the shaft 53 was coated with parting agents, and then the pipe was inserted in the coil 58. In this state, the coil 58 was dried. After drying, the bolts 57 were removed and the outer surface the coil 58 was smoothed. It is certain to obtain the sleeve with the density of 0.5 g/cm$^3$ and the outer diameter of 650 mm. After removing the mentioned pipe only, it is possible to put this sleeve on a roller body of a carrying roller.

EXAMPLE 4

A felting sheet from wool was cut longitudinally to obtain a strip with the thickness of 1 mm. and the width of 30 mm. With respect to the strip, two pieces were sewed together with a reinforcing thread on one longitudinal side. By this sewing, the strip was curved moderately in a horizontal plane and then the helical strip was obtained through the conical rollers. In the similar manner as in EXAMPLE 1, the helical strip was wound round a shaft with 50 mm. diameter to obtain a sleeve with high density made from wool. The sleeve can serve for finishing glass or the like in a polishing use.

EXAMPLE 5

Figure 7:
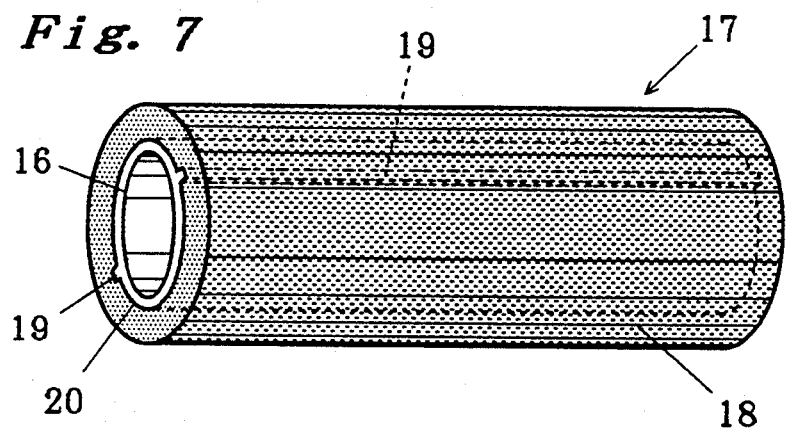
FIG. 7 is a perspective view of a roller united with a coiled sleeve.

In order to obtain a felting sleeve as shown in FIG. 7, there was employed the pipe 16 having two longitudinal stoppers 19 on the outer surface 20. The same helical strip as in EXAMPLE 1 was wound round the pipe 16 with the outer diameter of 76 mm. and the inner diameter of 65 mm. In the similar pressing process as in EXAMPLE 1, the wound strip decreased markedly in length and contracted slightly inward to tighten the pipe 16 strongly. Therefore, the pipe 16 was fitted in the compressed strip, i.e., the sleeve 18 by the stoppers 19 formed on the outer surface 20. The outer surface of the coil 18 was impregnated with acrylic resin and dried, and then the outer surface of the coil 18 was smoothed. The shaft 12 and the disks 44 and 46 were removed to obtain the sleeve 18 with the density of 0.5 g/cm$^3$ and the outer diameter of 100 mm.

Since the pipe 16 is united with the sleeve 18, it is practicable to use the roller 17 as a carrying or driving roller directly and abridge replacement for inserting another pipe, i.e., a roller body into the sleeve 18. The stoppers 20 may be generally two or more longitudinal projections, or simple convexities or embossment on the outer surface 20 in stead of such projections.

EXAMPLE 6

Figure 8:
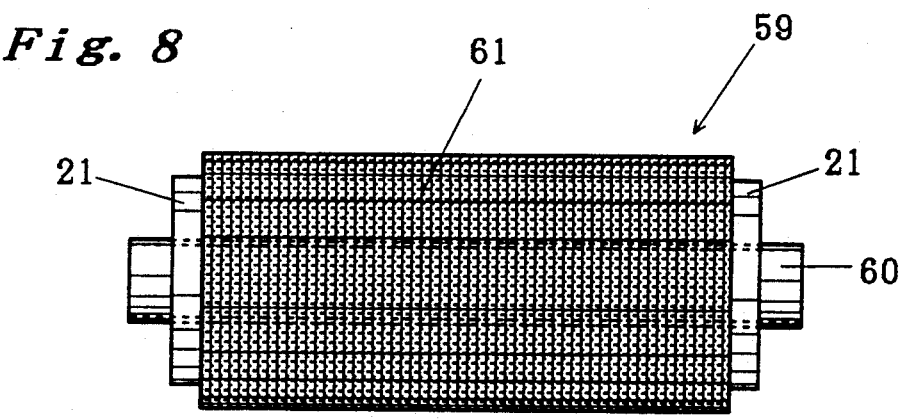
FIG. 8 is a side view of another roller united with the coilded sleeve and two fixing disks.

In the preparation of the roller 59 in FIG. 8, there was employed a pipe 60 with the similar stoppers (not shown) formed on the outer surface as in EXAMPLE 5 and each of two fixing disks 21, 21 was previously weld on the one side of the pipe 60. After the helical strip had been wound round the pipe in the similar manner as in EXAMPLE 1, the press machine applied pressure strongly on one side face of the wound strip. In the compressed state of the strip, the other of the fixing disks 21, 21 was weld or pinned on the other side of the pipe 60. As the wound strip contracted slightly inward to tighten the pipe 60 strongly, the pipe 60 was united with the compressed strip, i.e., the sleeve by means of the stoppers. The outer surface of the coil 61 was impregnated with acrylic resin and dried. The outer surface of the coil 61 was smoothed to obtain the sleeve with the density of 0.5 g/cm$^3$ and the diameter of 100 mm. The roller 59 can serve for the similar usage as in EXAMPLE 5. When the sleeve has worn out, it is practicable to make an exchange by removing each of the fixed disks 21, 21.

EXAMPLE 7

The felting sheet with the same composition as in EXAMPLE 2 having the thickness of 1.5 mm. was cut in 15 mm. wide to produce many strips. After coating the outer surface of the shaft 32 (FIG. 12) with parting agents, the helical strip obtained in the same manner as in EXAMPLE 1 was wound round the shaft 32 with 35 mm. diameter so as to contact the inner longitudinal side with the outer surface of the shaft 32 as tightly as possible. In this state, the both sides of the wound strip 33 were impregnated with liquid resin. The opposite faces of the disks 29 and 29 having the concave 30 or convex 31 were coated with parting agents. The wound strip 33 was placed between the disks 29, 29 and then pressed down strongly with a press machine 34 so as to compress the strip 33. The disk 29 was fixed with stay bolts 62 in the pressing position, as indicated in solid lines in FIG. 12. As the wound strip 33 decreased markedly in length to get the compressed strip 35, the outer surface of the coil 35 was impregnated with acrylic resin and then dried. In hereafter the similar manner as in EXAMPLE 1, it is certain to obtain the sleeve 27 with the density of 0.5 g/cm$^3$ and the outer diameter of 600 mm.

As shown in FIGS. 10 and 11, the corresponding convex 25 or concave 26 was formed on the both side faces of the sleeve 27, respectively. Thus, it is possible to fit each side face of one or more sleeves 27 on the inside face of the fixing disk 36 or 37 (FIG. 11) and hold them between the disks 36, 37 with the corresponding concave or convex. As this result, the sleeves 27 can always rotate together with the body 28, i.e., the roller does not run idle even if large torque is placed on the body 28. If the sleeve parted in three (two of them shown in FIG. 11) is put on the body 28, only the worn-out center part of the sleeve can be exchanged upon occasion. The reason is that a wearing amount of the sleeve was lack of uniformity and the center part wore out generally more than the left or right part.

EXAMPLE 8

The felting sheet with the same composition as in EXAMPLE 3 was cut in 20 mm. wide to produce many strips. After coating the outer surface of a long shaft 63 (FIG. 14) with parting agents, the helical strip was wound round the shaft 63 in the similar as in EXAMPLE 3. With respect to the disk 64 and 65, they have the rectangular concave 66 or convex 67 on the opposite inside face. The disk 64, 65 were connected with stay bolts 68 in the pressing position, as indicated in solid lines in FIG. 14. As the wound strip decreased markedly in length to get the compressed strip 69, the shaft 63 was removed from the coil 69 and then the inner surface of the coil was impregnated with acrylic resin. Subsequently, the outer surface of another pipe (not shown) having the same diameter as the shaft 63 was coated with parting agents, and then the pipe was inserted in the coil 69. In this state, the coil 69 was dried. After drying, the bolts 68 were removed and the outer surface the coil 69 was smoothed. Finally, the pipe was removed to get the sleeve 70. It is certain to obtain the sleeve 70 (FIG. 13) having the rectangular convex 71 or concave 72 on the both side faces.

EXAMPLE 9

The felting sheet with the same composition as in EXAMPLE 3 having the thickness of 1.5 mm. was cut in 50 mm. wide to produce many strips. The helical strip obtained in the similar manner as in EXAMPLE 1 was wound round the shaft with 1400 mm. diameter. The wound and compressed strip was prepared and smoothed in the similar manner as in EXAMPLE 1. The shaft and the disks were removed from the coil and then the inner surface of the coil was impregnated with acrylic resin. After coating the outer surface of another pipe having the same diameter as the shaft with parting agents, the pipe was inserted in the coil. In this state, the coil was dried. After drying the coil, the pipe was removed from the coil. Further, on the inner surface of the coil, four longitudinal grooves 5 were sunk at equal circumferential distance with a known milling cutter, as shown in FIG. 16. The groove 5 had rectangular shaped section. The depth of the grooves was determined to 8 mm. not so as to cut the reinforcing thread when the grooves were sunk in the inner surface of the sleeve 1. As this result, it is certain to obtain the sleeve 1 with the density of 0.5 g/cm$^3$ and the outer diameter of 1500 mm.

In a steel manufacturing plant, the sleeve 1 (FIG. 15) is employed on the body of a driving roller of rollers for carrying a hot steel plate (not shown) after electrolytic tin plating. The longitudinal stoppers 41 were mounted on the outer surface of the roller body 40 and had the same section and circumferential distance as the grooves 50. Therefore, all of the grooves 5 are fitted on the stoppers 41 when the sleeve 1 is put on the roller body 40. As this result, the sleeve 1 can always rotate together with the body 40. If the sleeve 1 has worn out, it is practicable to exchange it by removing from the body 40.

EXAMPLE 10

The felting sheet with the same composition as in EXAMPLE 2 was cut in 40 mm. wide to produce many strips. Reinforcing thread was attached with straight stitches on one longitudinal side of the strip. After coating the outer surface of a long shaft having 920 mm. diameter with parting agents, the helical strip was wound round the shaft. By the similar treatment as in EXAMPLE 3, the coil can be obtained. Further, in the inner surface of the coil, four longitudinal grooves 6 were sunk at equal circumferential distance, as shown in FIG. 17. The groove 6 had half-circular shaped section. The depth of the grooves 6 was determined not so as to cut the reinforcing thread. As this result, it is certain to obtain the sleeve 1 with the density of 0.5 g/cm$^3$ and the outer diameter of 1000 mm.

EXAMPLE 11

Figure 18:
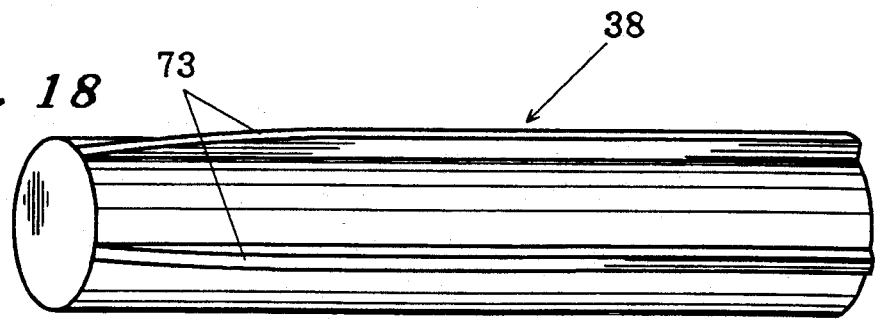
FIG. 18 is a perspective view of a shaft for preparing a coiled sleeve with relatively small diameter having longitudinal grooves on the inner peripheral surface.

The felting sheet with the same composition as in EXAMPLE 2 was cut in 20 mm. wide to produce many strips. The helical strip obtained in the same manner and in EXAMPLE 1 was wound round a long shaft with 35 mm. diameter. By the similar treatment as in EXAMPLE 3, the coil had the length of about 500 mm. The shaft was removed from the coil and then the inner surface of the coil was impregnated with acrylic resin. There was employed another press-deforming shaft 38 (FIG. 18) that became gradually in thicker toward the back side and had four longitudinal projection 73 at equal circumferential distance. The outer surface of the shaft 38 was coated with parting agents and then the shaft 38 was perfectly inserted into the coil. In this state, the coil was dried. After drying, the shaft 38 was removed and the outer surface the coil was smoothed. It is certain to obtain the sleeve with the density of 0.5 g/cm$^3$ and the outer diameter of 60 mm. It is possible to put the obtained sleeve on a roller body for a driving roller of carrying rollers.

EXAMPLE 12

In order to prepare a sleeve with the diameter of 150 to 300 mm., the helical strip obtained in the same manner as in EXAMPLE 1 was wound round a long shaft as shown in FIG. 5. After winding and pressing the strip weakly, the wound strip decreased in length to about 80%. The shaft was removed from the coil and then the inner and outer surfaces of the coil were impregnated with acrylic resin. After drying the coil, four longitudinal grooves were sunk in the inner surface of the coil with a milling machine. While, a long roller body had four longitudinal stoppers in the same section and circumferential distance as the grooves mentioned above, and a flange was fixed on one side of the roller body. After ten coil had been put on the roller body in line, another flange was fitted and fixed on the other side of the body by pressing the coils again. After repressing these coils, i.e., the sleeve, the outer surface of the sleeve was coated with acrylic resin again and the outer surface of the sleeve was smoothed uniformly. As this result, it is certain to obtain a long and slender roller including the felting cover and the shaft. The roller is generally used as a driving roller of carrying rollers set up in the place where the sleeve wore down almost uniformly. When the sleeve has worn out, it is practicable to exchange all of the coils simultaneously.

What is claimed is:

1. A method for preparing wear-resistant felting coiled sleeve having buffer or cushion function, which comprises:
    attaching reinforcing thread with straight stitches along one longitudinal side of the felting strip by sewing and curving moderately the strip in a horizontal plane simultaneously;
    bending the curved strip into a helical shape;
    winding the strip tightly round a shaft of a suitable former to form into a cylindrical shape;
    applying axial pressure on one side face of the wound strip to compress the wound strip so as to keep cylindric without deforming into a barrel shape, as the reinforcing thread has been disposed along the inner side thereof;
    impregnating the inner and/or outer surfaces of the wound and compressed strip with finishing resin and then drying the impregnated and wound strip, the coil thus obtained maintaining buffer or cushion function of felting, as the resin embeds only into the inner and/or outer surface portions of the coil; and
    smoothing the outer peripheral surface of the coil before or after removing the shaft of the former.

2. A method as set forth in claim 1, further comprising impregnating the both sides of the coil with liquid resin, forming a convex on one side face and a concave on the other side face of the sleeve respectively by pressing down between a pair of the disks having a concave or convex on the opposite face, and then drying the compressed strip.

3. A method as set forth claim 1, further comprising cutting longitudinal grooves on the inner surface of the sleeve at equal circumferential distance after the resin treatment.

4. A method for preparing felting coiled sleeve, which comprises:
    attaching reinforcing thread with straight stitches along one longitudinal side of the felting strip by sewing and curving moderately the strip in a horizontal plane simultaneously;
    bending the curved strip into a helical shape;
    winding the strip tightly round a shaft of a suitable former to form into a cylindric shape;
    applying pressure on one side face of the wound strip to compress the wound strip;
    keeping the compressed strip cylindric; and
    smoothing the outer peripheral surface of the coil;
    a heat-sensitive plastic film having a low melting point is sewed to the strip at the same time when the reinforcing thread is attached to the strip, and the compressed strip is heated at the temperature above the melting point of the film to fasten the overlapped portions of the strip to each other, thereby keeping it cylindric.

5. A method for preparing a wear-resistant felting coiled sleeve having buffer or cushion function, which comprises:
    sewing a heat-sensitive plastic film having a low melting point to the strip when the reinforcing thread is attached to the strip with straight stitches along one longitudinal side of the felting strip and curving moderately the strip in a horizontal plane simultaneously;
    bending the curved strip into a helical shape;
    winding the strip tightly round a shaft of a suitable former to form into a cylindric shape;
    applying pressure on one side face of the wound strip to compress the wound strip;
    heating the compressed strip at the temperature above the melting point of the film to fasten the overlapped portions of the strip to each other, thereby keeping it cylindric; and
    smoothing the outer peripheral surface of the coil before or after removing the shaft of the former.

* * * * *